Sept. 1, 1959  M. YOUNG ET AL  2,902,121
EQUALIZER DEVICE FOR HYDRAULIC BRAKES
Filed Aug. 12, 1957
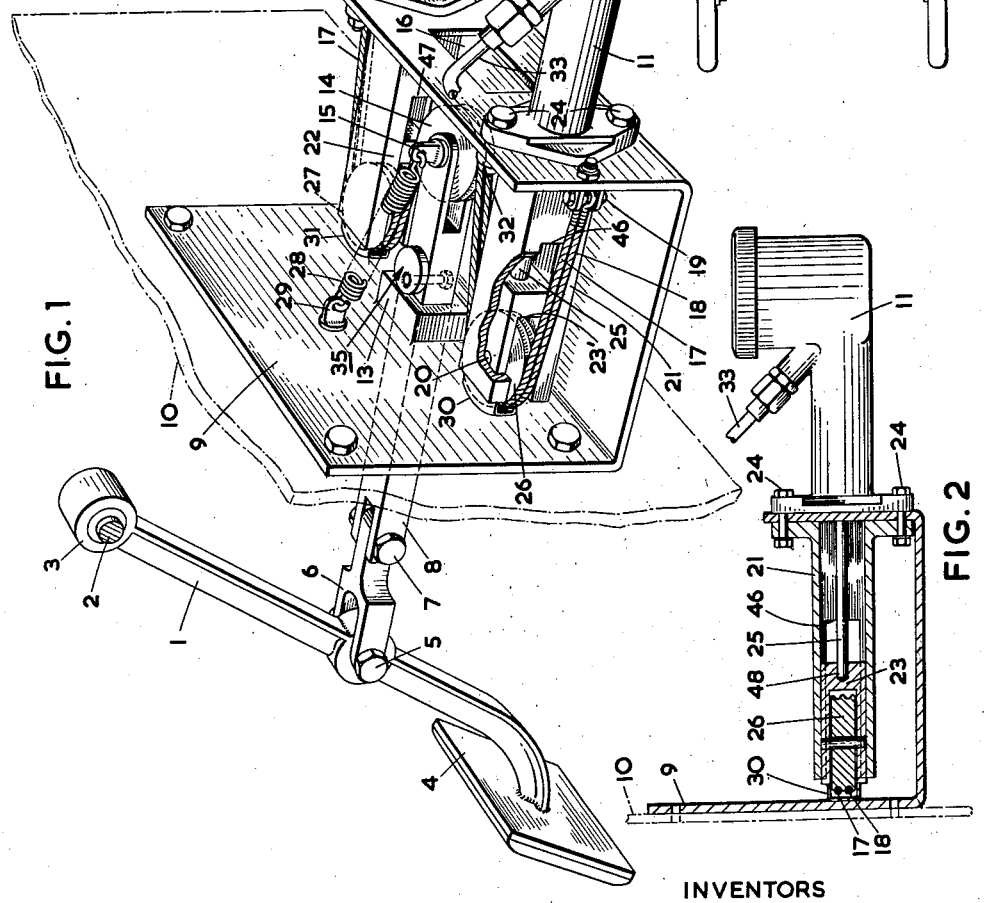
INVENTORS
MORLEY YOUNG
VERNON YOUNG
BY Frederick E. Bromley
ATTORNEY

United States Patent Office 2,902,121
Patented Sept. 1, 1959

2,902,121

EQUALIZER DEVICE FOR HYDRAULIC BRAKES

Morley Young and Vernon Young,
Courtland, Ontario, Canada

Application August 12, 1957, Serial No. 677,658

4 Claims. (Cl. 188—204)

This invention relates to braking systems and is particularly applicable in arrangements comprising fluid actuated vehicle brakes.

Hydraulic braking arrangements are well known and usually comprise a master cylinder from which fluid pressure may be directed simultaneously to a plurality of slave motors each of which is adapted to actuate a braking device.

Such arrangements are ordinarily satisfactory so long as no leak develops anywhere in the system. However, if a leak occurs in a system therein one master cylinder controls all the brake motors on a vehicle, the said motors all fail to function properly and a great danger to public safety arises.

One obvious improvement in such a system is to employ two master cylinders, one controlling the rear braking motors (brakes) and the other the front braking motors. However, this method raises the problem of correctly equalizing the braking action on all the wheels of a vehicle, and prior art inventions directed to this objective have encountered difficulties not heretofore wholly overcome.

The teachings of prior art arrangements disclose two master cylinders each operating a set of brake motors on a vehicle, and wherein equalization is achieved by the use of a differential linkage connected to the pistons of each cylinder and to a control pedal. If pressure becomes degraded in one side of the system the linkage acts to "take up the slack" and maintain a safe actuating pressure in the other side of the system.

The present invention is an improvement on the above mentioned system and provides a greater safety against braking failure by providing a linkage that is more flexible and has greater range of control so that at least one set of brakes can be expected to function normally even if the other set are completely devoid of pressure due to a breakdown of one pressure line.

According to the present invention there is provided a dual braking system including two master pressure cylinders, a pulley and cable linkage joining the two cylinder pistons for actuating the same, and a master brake pedal including an actuating rod carrying a pulley, the arrangement being characterised in that the cable is fixed at its ends and rides over the three pulleys in such fashion that when the brake pedal pulley is depressed, the force is exerted to tension the cable which rides the two pistons inwardly of their cylinders as the cable travels over the pulleys on the respective said members.

This arrangement provides a very smooth differential control of the pistons over a much wider range of movement than has hitherto been achieved.

In a further aspect, the invention provides an automatic thrust ratio so that if one half of the system becomes suddenly weak or fails the thrust ratio descends rapidly from a 2:1 thrust ratio to a limit of 1:1 ratio. This causes the brake pedal to become more sensitive in the event that one of the brake sets fails to respond to a normal thrust. A further feature is that the cable and pulley arrangement provides a highly desirable system for effecting a power increasing action whereby little effort on the part of the driver is required to apply the brakes of the vehicle.

The present invention also contemplates additional means for adjusting slack in the system in a manner that does not in any substantial degree alter the scope of the differential effect.

In a further aspect the invention may include an added safety feature. The cable interlinking the control rods and pistons is doubled, each cable per se being independently able to carry on if its mate should break or stretch excessively due to ageing.

The invention will now be disclosed in greater detail by the following description read in conjunction with the accompanying drawings wherein:

Figure 1 is a perspective view of a braking system in accordance with the invention.

Figure 2 is a side elevation partly in section of one element of the system including a part of a piston rod and slide arrangement.

Figure 3 is a sectional view of a slack adjustor according to the invention.

Figure 4 is a schematic representation of the invention as applied to the braking arrangements of a four wheeled vehicle.

Referring now to these drawings, 1 is a brake actuator (pedal) of the cantilever type having a pivotal end 3 journalled in a pivot 2 and a foot pedal 4 at its other end. Intermediate of the length of pedal 1 a boss is pierced to journal a cross-pin 5 which receives a fork 6. A brake drive rod 8 is swivelly and driveably joined to the fork 6 by cross-pin 7.

The pressure control system may be mounted upon a U-bracket 9 which is intended in this example to be mounted upon the motor side of the firewall 10 of a motor vehicle, one side of the U-bracket being fastened by bolts or other means to the said firewall. The other side of the U-bracket supports a pair of conventional master cylinders 11, 12. The drive rod 8 passes through a boss or sleeve 13 positioned centrally on the side of the bracket adjacent the fire wall and is made of a non-circular cross-section to slidably support the rod 8 so that it cannot turn askew. The back portion or inner end of the rod 8 is forked to receive a pulley 14. This pulley rotates about a spindle which is fitted with a spring retainer eye 15. The rod 8 with the pulley 14 is slideable in sleeve 13 and may be driven backward by pedal 4 to pass at least partly through the aperture 16 in U-frame 19. The pulley 14 and drive rod 8 are normally forced forward in the sleeve to stop-cam 35 by a suitable tension spring 28 which is tensed between eye 15 on the pulley spindle and eye 29 on the inner wall of U-bracket 9. The outer rear wall of the U-bracket supports the pair of master cylinders 11 and 12 symmetrically positioned about the aperture 16.

The U-bracket rear wall, supports inwardly a pair of piston guides 21, 22 which may conveniently be mounted by the same screws 24, which hold the master cylinders on the outer side of the U-bracket 9. Each piston guide contains a slide 23 which co-acts with a piston rod 25 by way of the interfitting elements 48 to actuate the pressure piston in the master cylinder 11 or 12. The slide 23 is slotted at 23', to receive a pulley 26 or 27, one such pulley being associated with a slide and piston for each of the two master cylinders. Pulleys 26 and 27 are each rotatable on a pin, such as that indicated at 20. A pair of flexible steel cables 17, 18 is fixed by a shackle 19 on one side of the rear wall of the U-bracket 9 and are trained over slave pulley 26, pulley 14 on the brake drive rod and over slave pulley 27 thence back to the other side of the rear wall of the U-bracket to a second shackle 19. The steel cables are drawn up taut by the shackle nuts and by the stop-cam 35 which is shown in detail on Figure 3. Stop-cam 35 comprises a cam 36 fixed on a spindle 37, a lock washer 38 and nut 39. This cam can be adjusted to maintain the cables 17, 18 taut and/or to take up slack caused by variations in the quiescent pressure status of the pistons in the master cylinders 11, 12.

The master cylinders apply their pressure as shown in the schematic diagram, Figure 4. One cylinder and its piston driven by pulley 26 applies braking force to the wheels 46, 47 by way of fluid lines 33, 44, 45. The other cylinder applies its braking force by pulley 27 by way of pressure lines 34, 40, 41 to wheels 42, 43.

The arrangement operates as follows: when the brake pedal 4 is depressed, the master pulley 14 is driven inwardly of the U-frame and the cables 17, 18 being tied fixedly at 19, the slave pulleys 26, 27 are forced rearwardly by the effort of the flexible cables 17, 18 to retain their length against the tensing force of the inwardly moving pulley 14. This causes both piston rods 25 to be forced inwardly of their respective cylinders, 11 and 12. If the pressure in one fluid line is relieved by some fault, the pulley and piston rod and piston of the connected system will yield more than will the normal system but the length of the cables 17, 18 cannot change so long as pressure is applied to the rod 8; the slide of the leaky system will reach a stop 46 or 47 as the case may be, whereupon all additional force is then applied in an effort to drive the other slide toward its respective stop 46 or 47. These stops may be formed by slots cut in the respective sleeves, or on the other hand the stops may be otherwise devised in approved construction.

It will be observed that the cable and pulley assembly herein described is in effect an effort multiplier wherein the long thrust of the rod 8 is transformed into an even two to one tractive effort as long as both cylinders maintain approximately equal pressures, but if one piston slide bottoms on the stop 46 before the other slide has applied the desired pressure, the braking force is immediately doubled since as soon as one pulley becomes stuck the pulley and rod system 8, 14 instantly commences to apply all the thrust upon the other slide and the drive ratio instantly changes from 2:1 to 1:1. This enables the operator, without added conscious effort, other than a continued depression of the brake pedal 4 to apply a greater braking force to the good side of the system to compensate for the loss of braking force in the faulty side of the system. The advantage of this feature resides in the fact that for a uniform thrust of the brake pedal 4 the braking force of the effective cylinder is increased by a factor of 2 as soon as the defective cylinder has "bottomed."

In the case of a leaky cylinder which is able to provide some braking force, the thrust ratio varies as the pedal 4 is depressed between a ratio 2:1 and a ratio 1:1, the actual ratio being a direct function of the braking deficiency between the stated limits.

In order to remove risk of cables coming off the pulleys at any time, they are fitted with cable retainer guards, 30, 31 and 32.

The cam 35 is useful for adjusting for cable stretch or for small seasonal changes in the quiescent pressures in the two master cylinders. It takes care incidentally of minor variations in fluid balance between the two systems.

The cable drive with its unique continually variable thrust ratio facilitates construction of a neat and compact master-cylinder package and the invention is particularly well adapted to satisfy the growing popular demand for a top suspension brake pedal of long thrust. It is also readily adapted for connection to power-assist arrangements, which operate particularly well with this invention in view of the variable ratio feature.

While the construction depicted and described is considered to be a preferred form of the invention other structural modifications may be resorted to as fairly come within the ambit of the ensuing claims.

What we claim is:

1. An equalizer device comprising a supporting unit, a depressible drive rod journalled therein for reciprocal movements and having a rear cable connection end, a first pulley rotatably carried on said rear cable connection end, a pair of pressure translating rods reciprocably mounted on said supporting unit, one at each side of said depressible drive rod and substantially parallel thereto, said pressure translating rods having forward ends, a second pulley supported for reciprocal movement with the forward end of each of said pressure translating rods and arranged in the plane of said first pulley, and a flexible cable having an intermediate reach portion trained over said first pulley and reversely trained over each of said second pulleys, said flexible cable having end portions extending rearwardly of said forward ends of said pressure translating rods and fixed to said supporting unit.

2. An equalizer device as defined in claim 1, in which the depressible drive rod is spring-tensioned for retractile movements, and in which each of the second pulleys is journalled in a guide reciprocably guided on the supporting unit for movement with the respective pressure translating rod and having an abutting connection therewith.

3. An equalizer device as defined in claim 1, in which an adjustable stop is provided for limiting the travel of the depressible drive rod in a return movement.

4. An equalizer device as defined in claim 1, in which a stop cam of an adjustable type is mounted on the depressible drive rod to abut a relatively fixed surface on the supporting unit for limiting travel of said depressible drive rod in a return movement.

References Cited in the file of this patent

UNITED STATES PATENTS

| 421,247 | Cook | Feb. 11, 1890 |
|---|---|---|
| 867,849 | Stoker | Oct. 8, 1907 |
| 1,678,949 | Moser | July 31, 1928 |
| 2,559,850 | Davis | July 10, 1951 |

FOREIGN PATENTS

| 839,126 | France | Dec. 26, 1938 |